(12) United States Patent
Brandes

(10) Patent No.: US 7,021,592 B2
(45) Date of Patent: Apr. 4, 2006

(54) QUICK-ADJUSTING MOUNTING HEAD

(76) Inventor: Raymond V. Brandes, 1844 Mt Cello Rd., Marianna, FL (US) 32448

( * ) Notice: Subject to any disclaimer, the term of this patent is extended or adjusted under 35 U.S.C. 154(b) by 0 days.

(21) Appl. No.: 10/781,253

(22) Filed: Feb. 18, 2004

(65) Prior Publication Data

US 2005/0178935 A1 Aug. 18, 2005

(51) Int. Cl.
*F16M 11/14* (2006.01)
(52) U.S. Cl. .............. 248/181.2; 248/178.1; 248/188.7
(58) Field of Classification Search ............ 248/177.1, 248/181.1, 181.2, 178.1, 241, 121, 122.1, 248/125.9, 188.7
See application file for complete search history.

(56) References Cited

U.S. PATENT DOCUMENTS

| | | | |
|---|---|---|---|
| 1,375,888 A | | 4/1921 | Baer |
| 1,735,212 A | | 11/1929 | Pawsat |
| 1,863,756 A | | 6/1932 | Lufkin |
| 2,752,116 A | * | 6/1956 | Minnis .................. 248/181.1 |
| 2,775,423 A | * | 12/1956 | Strass .................. 248/180.1 |
| 3,239,176 A | | 3/1966 | Johnson |
| 4,431,329 A | * | 2/1984 | Baitelle .................. 403/55 |
| 4,606,522 A | * | 8/1986 | Heifetz .................. 248/276.1 |
| 4,695,022 A | | 9/1987 | Mendonsa et al. |
| 4,787,613 A | | 11/1988 | Hayes |
| 4,863,138 A | | 9/1989 | Dicke et al. |
| 4,974,802 A | * | 12/1990 | Hendren .................. 248/181.1 |
| 5,020,933 A | * | 6/1991 | Salvestro et al. ............. 403/90 |
| 5,060,894 A | | 10/1991 | Hillinger |
| 5,082,221 A | | 1/1992 | Lai |
| 5,307,797 A | | 5/1994 | Kleefeld |
| 5,505,415 A | | 4/1996 | Brett |
| 5,791,609 A | | 8/1998 | Hankins |
| 5,806,821 A | | 9/1998 | Phillips et al. |
| 6,007,032 A | | 12/1999 | Kuo |
| 6,283,421 B1 | | 9/2001 | Eason et al. |
| 6,334,594 B1 | | 1/2002 | Bailey |
| 6,352,228 B1 | | 3/2002 | Buerklin |
| 6,375,175 B1 | | 4/2002 | Baumann et al. |
| 6,379,073 B1 | * | 4/2002 | Yoo et al. ..................... 403/90 |

* cited by examiner

*Primary Examiner*—Amy J. Sterling
(74) *Attorney, Agent, or Firm*—J. Wiley Horton

(57) ABSTRACT

An easily adjustable scope mounting head and stand. The stand includes a stabilized base with a vertical rod extending upward. The scope mounting head is attached to the vertical rod. A ball and socket joint is located on one end of the mounting head and an adjusting knob is located on the opposite end. The ball is equipped with accessible mounting mens for attaching a spotting scope or similar article. When the user slackens the adjusting knob, the ball and socket joint is free to move in roll, pitch, and yaw. In addition, the entire mounting head can rotate about the vertical rod and slide up and down the vertical rod. When the user tightens the adjusting knob, all degrees of freedom are locked. Thus, the single adjusting knob provides all needed adjustment for the height and orientation of the spotting scope.

20 Claims, 10 Drawing Sheets

QUICK-ADJUSTING MOUNTING HEAD

BACKGROUND OF THE INVENTION

1. Field of the Invention

This invention relates to the field of mounting hardware. More specifically, the invention comprises a stand and adjustable mounting head which can be used to adjustably mount a piece of hardware such as a spotting scope.

2. Description of the Related Art

Telescopic "spotting scopes" have been in common use for many years. These optical devices are used to visually inspect objects at great distances. They require substantial magnification, typically in the range of 20× to 50×. Such scopes are difficult to hold steadily by hand. They are therefore often mounted on a tripod.

One common use for such spotting scopes is in the field of target shooting. Targets may be located 300 yards or more away from the shooter. The spotting scope must be aimed at the target, and must provide enough magnification for the shooter to accurately see the bullet strikes on the target (often holes in a piece of paper). A bullet hole may only be 0.200 to 0.300 inches in diameter. Thus, the reader will perceive the need for great magnification.

Those skilled in the art will realize that the spotting scope must be very carefully aimed and then locked on the target. It must then be held steadily. Even a slight shift will take the target out of the scope's field of view. However, the mounting system must also be easy to adjust so that the user can move the scope onto the target while looking through the eyepiece. In addition, the height and orientation of the mounting system must be easily adjusted to allow the user to employ the scope without unduly disturbing the shooting process.

As one example, some shooting competitions are conducted from the "off hand" position. "Off hand" means that the user is standing upright without any supplemental means of holding the rifle. Ideally, the user will fire a shot and then immediately look into the spotting scope to observe the bullet strike. In this situation, the spotting scope needs to be held near the user and roughly at eye level. A tall stand is obviously needed.

Prior art devices for holding spotting scopes and similar articles do exist. However, they typically have multiple locking features governing their various degrees of freedom. These are cumbersome to use.

BRIEF SUMMARY OF THE INVENTION

The present invention comprises an easily adjustable scope mounting head and stand. The stand includes a stabilized base with a vertical rod extending upward. The scope mounting head is attached to the vertical rod. A ball and socket joint is located on one end of the mounting head and an adjusting knob is located on the opposite end. The ball is equipped with accessible mounting means for attaching a spotting scope or similar article. When the user slackens the adjusting knob, the ball and socket joint is free to move in roll, pitch, and yaw. In addition, the entire mounting head can rotate about the vertical rod and slide up and down the vertical rod. When the user tightens the adjusting knob, all degrees of freedom are locked. Thus, the single adjusting knob provides all needed adjustment for the height and orientation of the spotting scope.

Figure 1:
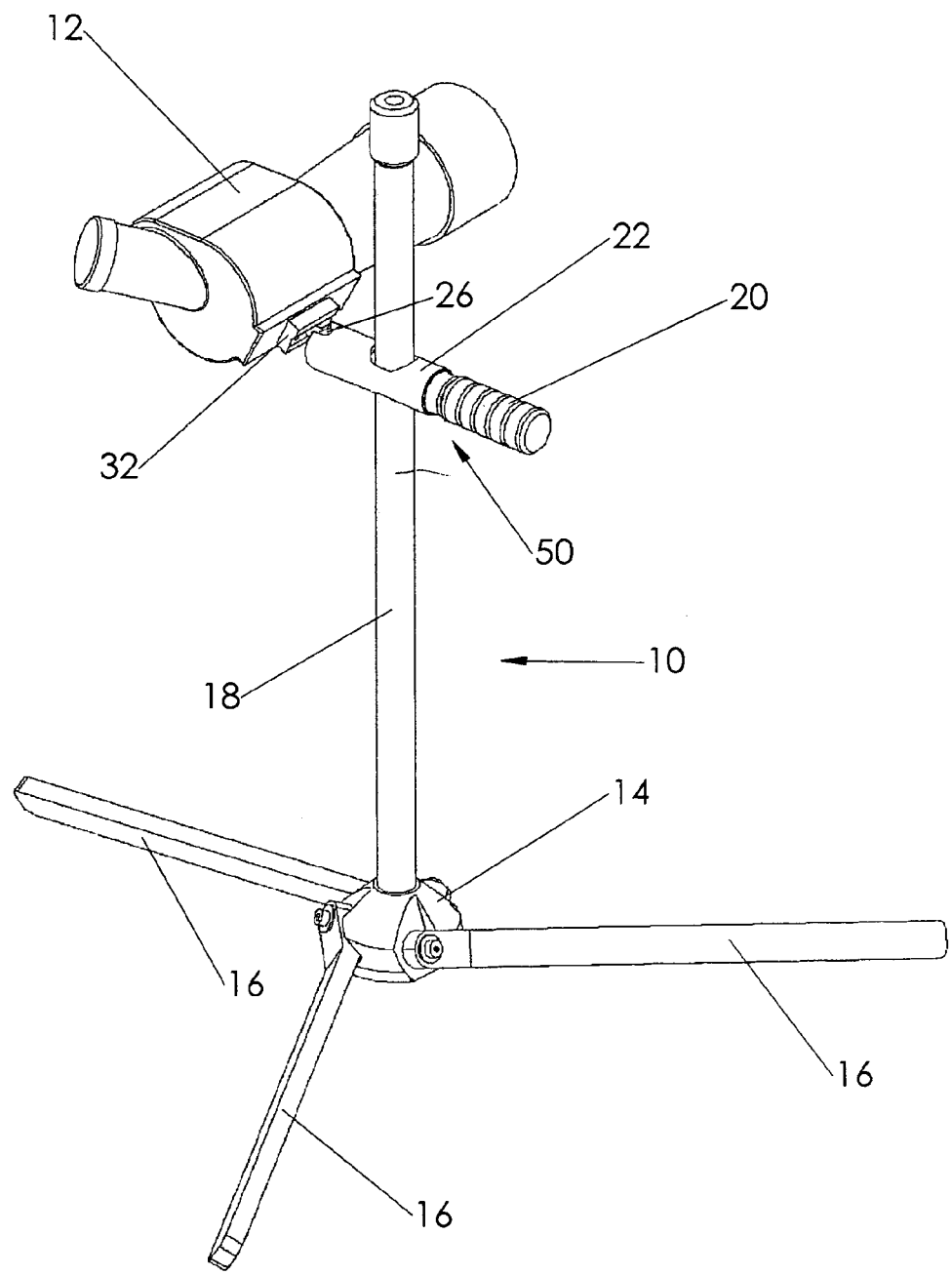
FIG. 1 is a perspective view, showing the present invention.

| REFERENCE NUMERALS IN THE DRAWINGS | |
|---|---|
| 10 | stand |
| 11 | scope attachment plate |
| 12 | spotting scope |
| 14 | base |
| 16 | leg |
| 18 | rod |
| 20 | adjusting knob |
| 22 | body |
| 26 | ball |
| 28 | threaded hole |
| 30 | fastener recess |
| 32 | mounting plate |
| 34 | through hole |
| 36 | threaded hole |
| 38 | dog screw |
| 40 | mounting screw |
| 42 | washer |
| 44 | stem |
| 46 | access hole |
| 48 | vee lock interface |
| 50 | mounting head |
| 52 | rod opening |
| 54 | threaded receiver |
| 56 | ball clamp |
| 58 | bar clamp |
| 60 | belleville washer |
| 62 | contraction |
| 64 | access notch |
| 66 | pin hole |
| 68 | ball receiver |
| 70 | rod receiver |
| 72 | flat |
| 74 | pivot |
| 76 | stop |
| 78 | canted portion |
| 80 | notch |

DETAILED DESCRIPTION OF THE INVENTION

FIG. 1 shows the present invention set up for use. Stand 10 includes rod 18 supported by a tripod configuration of three legs 16 attached to base 14. Mounting head 50 attaches to rod 18 and secures spotting scope 12 in a desired position and orientation.

When adjusting knob 20 is loosened, ball 26 is free to move within a ball and socket joint (free to move in roll, pitch, and yaw). This allows mounting plate 32, with spotting scope 12 attached, to move in roll pitch, and yaw. Likewise, mounting head 50 is free to slide up and down rod 18, and to yaw around rod 18. When adjusting knob 20 is tightened, all the degrees of freedom just mentioned are locked. Thus, the reader will appreciate that the loosening or tightening of the single adjusting knob allows complete adjustment of the position and orientation of spotting scope 12.

Figure 2:
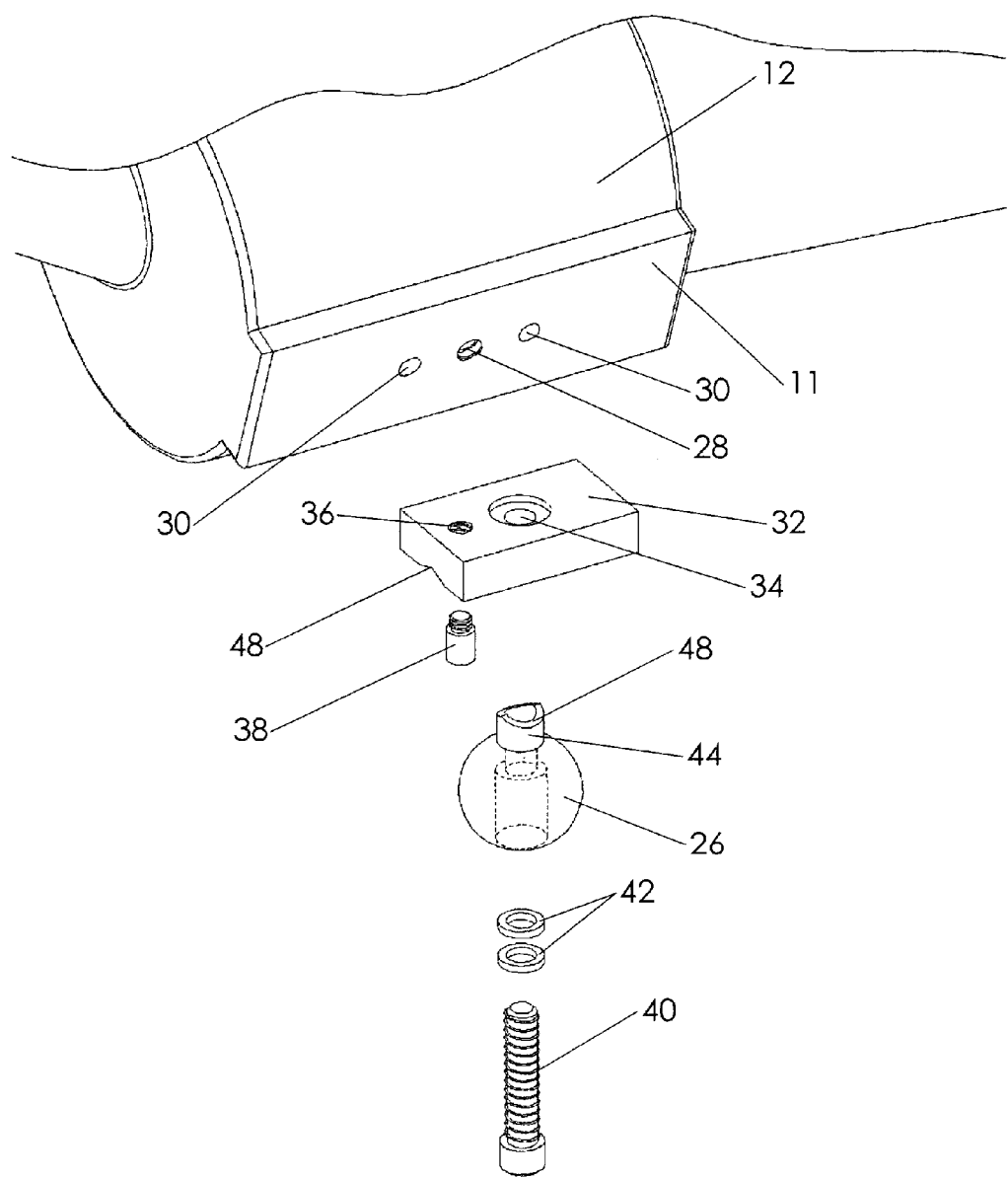
FIG. 2 is an exploded perspective view, showing how the ball and socket joint can be attached to a spotting scope.

FIG. 2 is an exploded view showing how ball 26 is attached to the spotting scope. The spotting scope features scope attachment plate 11, which is typically used to attach the scope to prior art tripods. Threaded hole 28 is in its center. Two fastener recesses 30 are also typically present. These contain screws which attach the scope attachment plate to the scope. The top of the screw heads typically lie beneath the outer surface of scope attachment plate 11.

Mounting plate 32 features through hole 34. Threaded hole 36 is offset a short distance. Dog screw 38, the purpose of which will be described shortly, screws into threaded hole 36. The side of mounting plate 32 which faces away from the spotting scope features vee lock interface 48 (a vee-shaped notch).

Ball 26 has an internal passage for receiving mounting screw 40. This passage goes through the center of the ball and through the center of stem 44. The reader will observe that the upper surface of stem 44 features a vee lock interface 48 shaped to lock into the vee lock interface 48 found on mounting plate 32.

The assembly of the device will now be described. The user places mounting plate 32 against scope attachment plate 11, with through hole 34 aligned with threaded hole 28. The user then aligns stem 44 with through hole 34 and mates the two vee lock interfaces. Finally, the user passes mounting screw 40 through the ball, into through hole 34 and into threaded hole 28. One or more washers 42 can be added to prevent mounting screw 40 from passing too far into threaded hole 28. The mounting screw is tightened, locking the ball to the spotting scope.

The mating of the two vee lock interfaces tends to prevent any rotation of the spotting scope with respect to the ball. However, dog screw 38 can be threaded into one of the two fastener recesses 30 for extra security. On scopes which do not have a fastener recess 30, the dog screw can be tightened against the outward-facing surface of scope attachment plate 11 itself.

Figure 3:
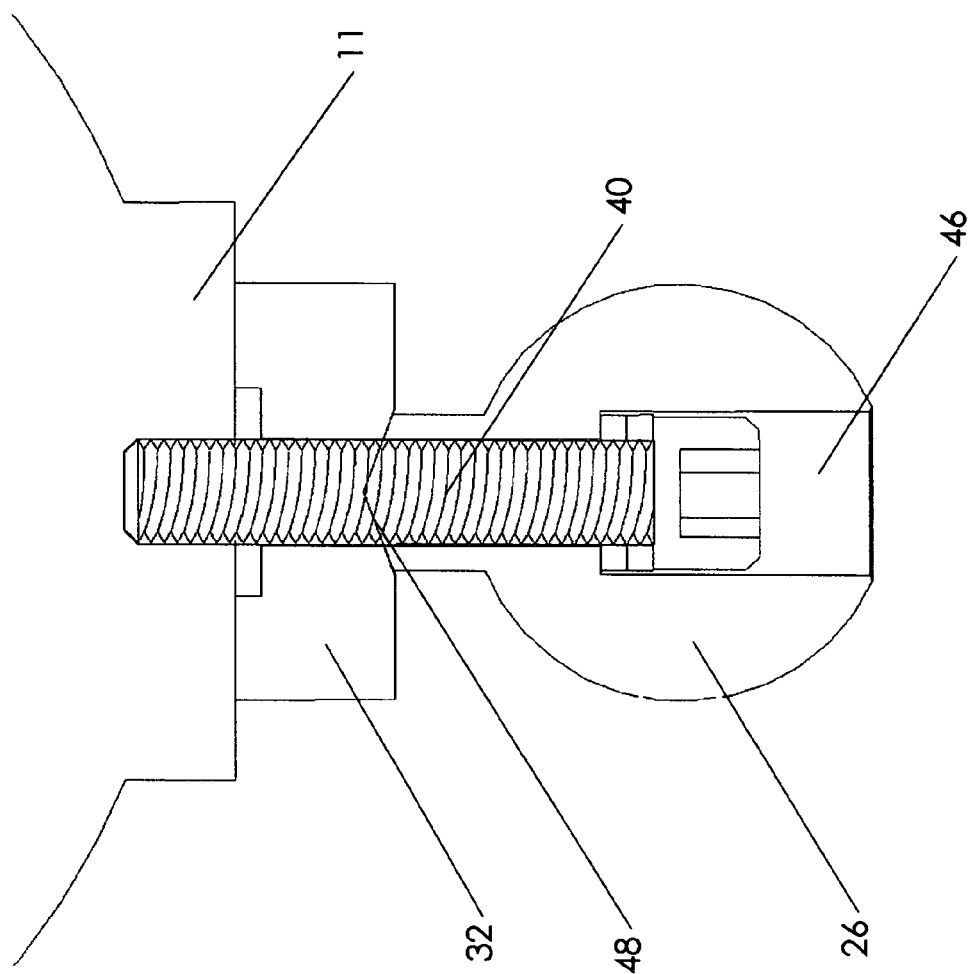
FIG. 3 is a sectional view, showing how the ball and socket joint can be attached to a spotting scope.

FIG. 3 shows the completed assembly, after mounting screw 40 has been tightened. Access hole 46 provides access to the mounting screw through ball 26. The ball will generally be trial-fitted to the scope before assembling the mounting head. However, it must be disassembled prior to placing the ball in the mounting head assembly.

Figure 4:
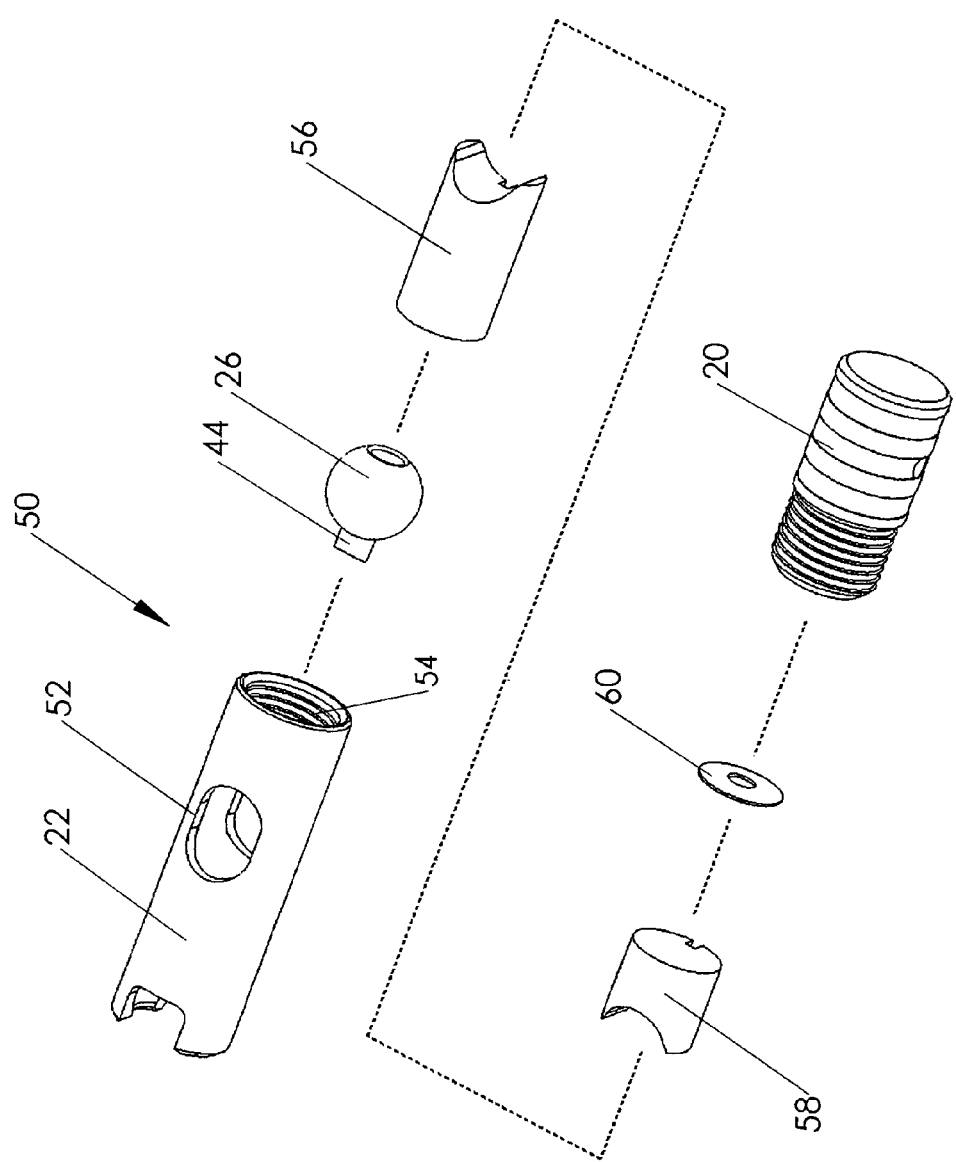
FIG. 4 is an exploded perspective view, showing the components of the mounting head.

FIG. 4 shows the components of mounting head 50 in an exploded view. Body 22 is a cylinder having a hollow interior. Rod opening 52 passes through the cylinder in a direction which is approximately transverse to its long axis. Threaded receiver 54 is located on one end. Ball 26 is place into the hollow cylinder first, and pushed toward the end facing away from the viewer. Ball clamp 56 is introduced next, followed by bar clamp 58 and belleville washer 60.

Figure 5:
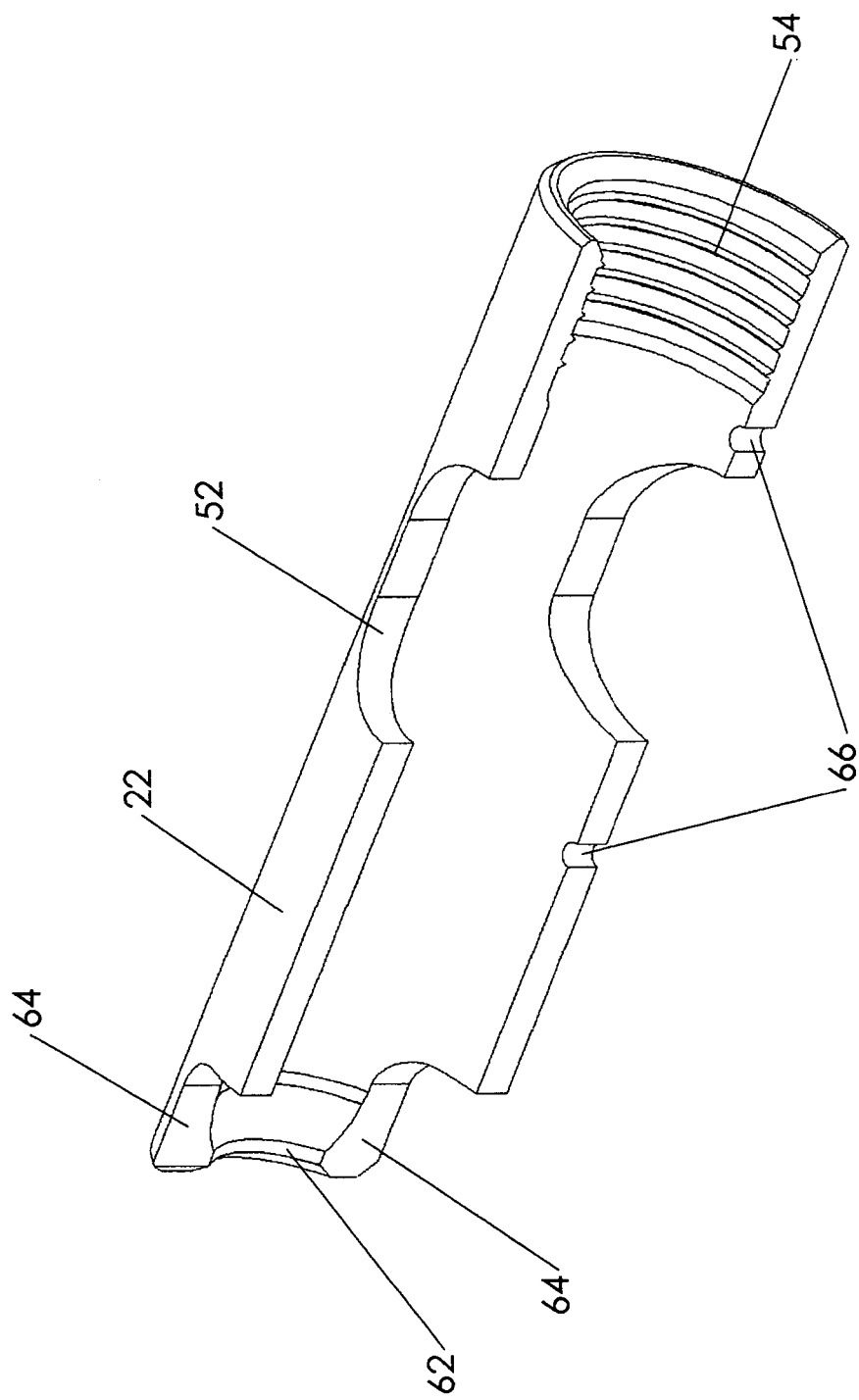
FIG. 5 is a sectional perspective view, showing the body.

Adjusting knob 20 comes last. It features a threaded portion which screws into threaded receiver 54. FIG. 5 shows a section through body 22, revealing its internal features. As stated, threaded receiver 54 is located on one end. The other end has an opening which is restricted by the presence of contraction 62. Contraction 62 is simply a region of reduced diameter. It can assume many forms. Access notch 64, which passes through the body from top to bottom, provides additional clearance for stem 44 when ball 26 is installed within body 22. Ball 26 actually rests against contraction 62, which retains it within the body when it is installed. Access notch 64 also provides access to mounting screw 40 when ball 26 is installed, thereby allowing the user to attach or detach a spotting scope.

Figure 6:
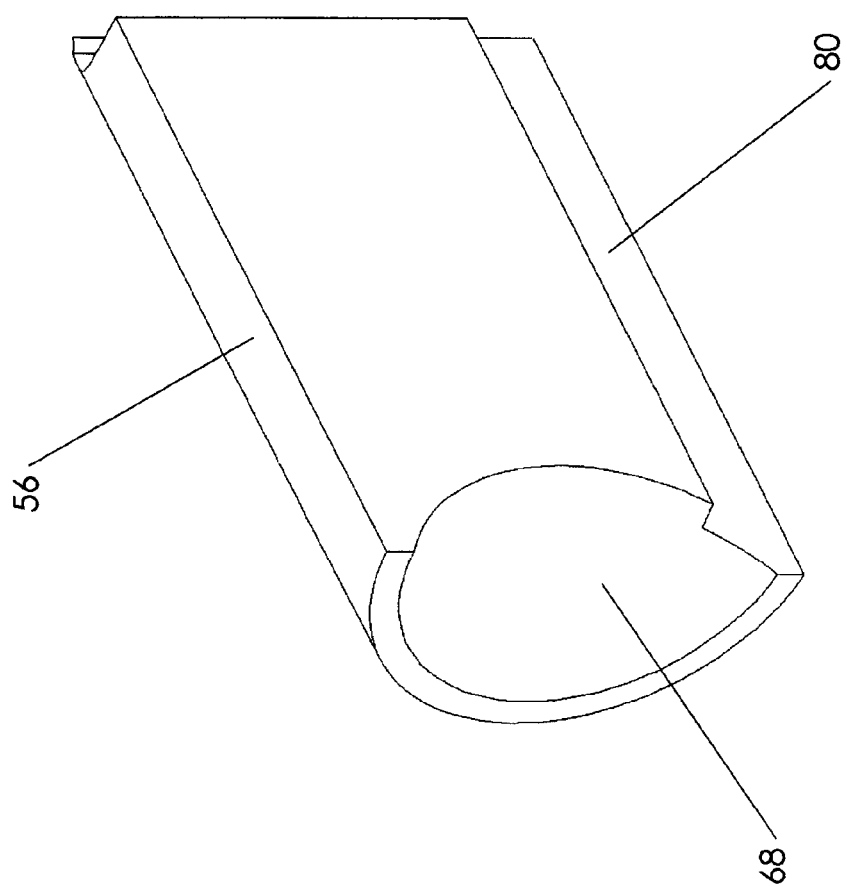
FIG. 6 is a sectional perspective view, showing the ball clamp.

FIG. 6 is a sectional view showing additional details of ball clamp 56. The portion of ball clamp 56 facing ball 26 opens into a spherical recess designated as ball receiver 68.

Figure 7:
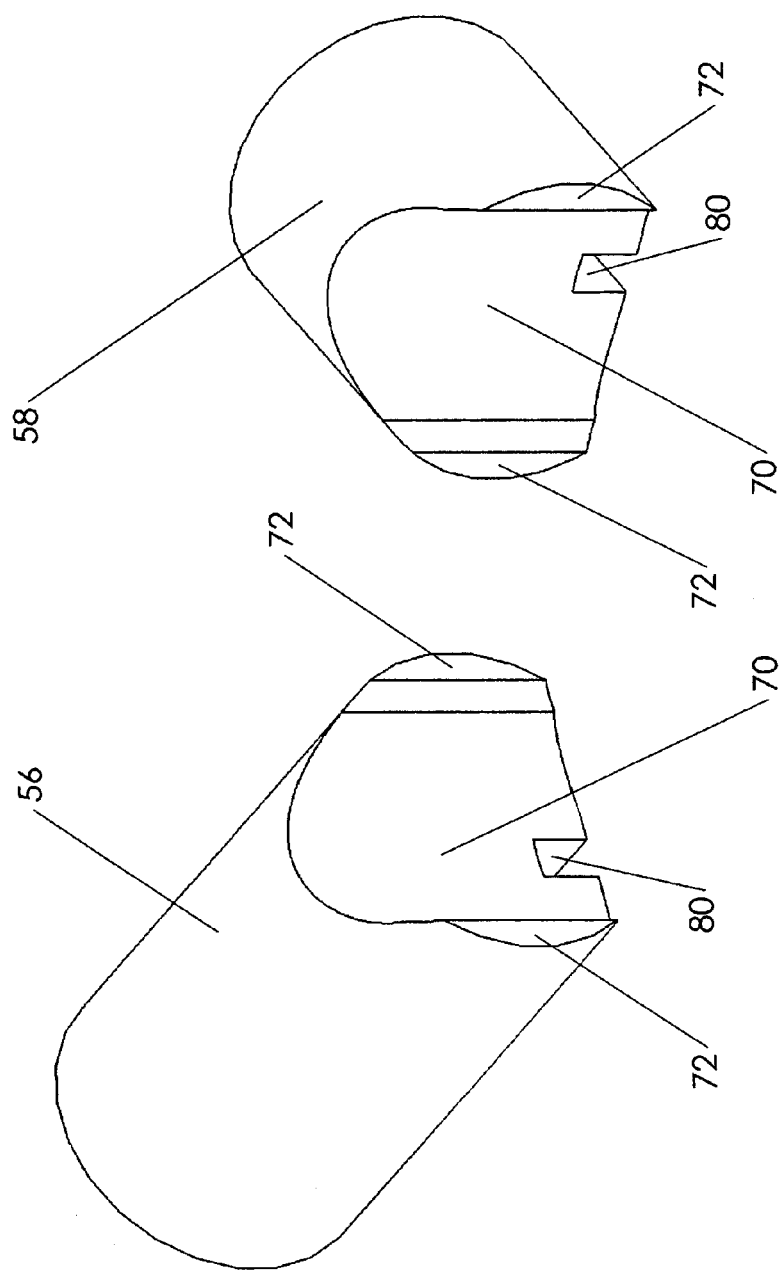
FIG. 7 is a perspective view, showing the ball clamp and the bar clamp.

FIG. 7 shows the opposite end of ball clamp 56, which opens into a cylindrical recess designated as rod receiver 70. Bar clamp 58 likewise has a rod receiver 70. Both the ball clamp and rod clamp also feature flats 72.

Figure 8:
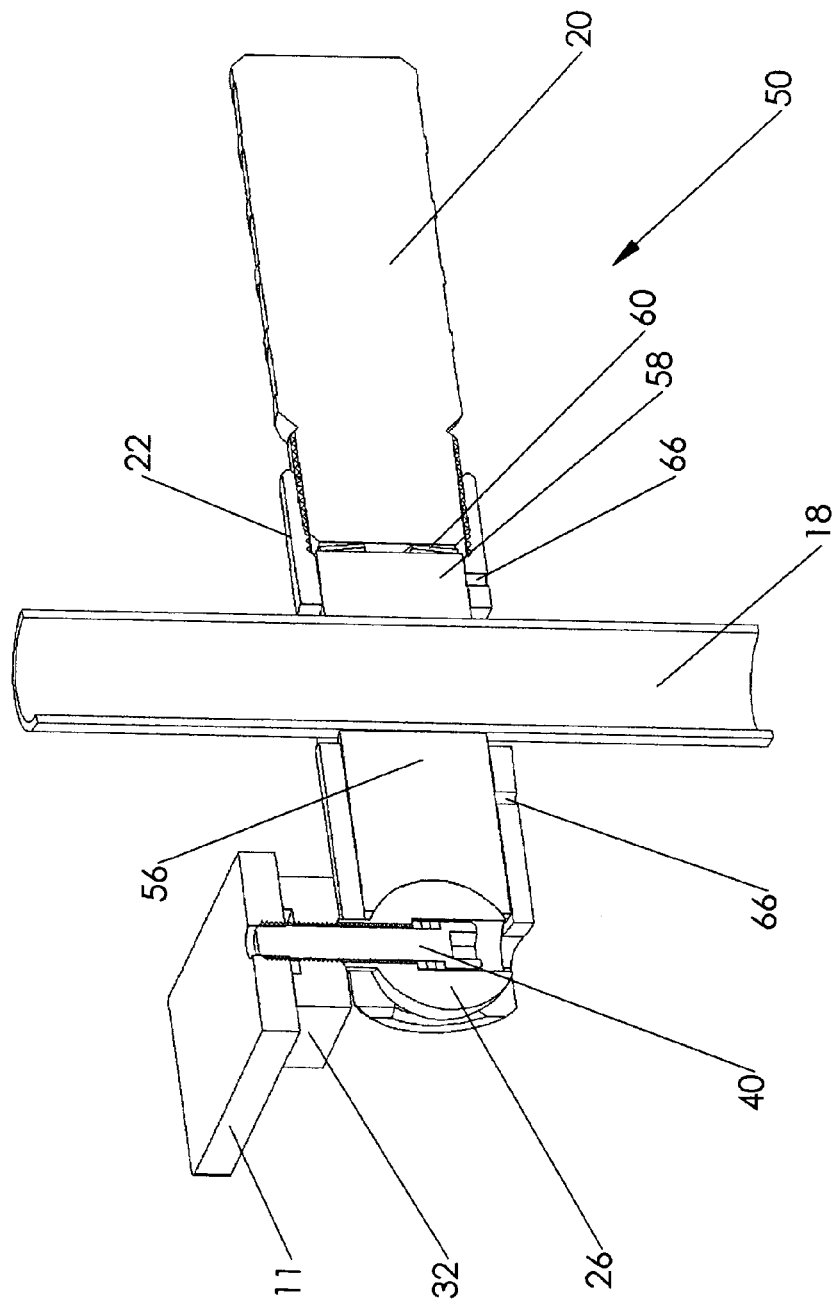
FIG. 8 is a sectional perspective view, showing the operation of the mounting head.

FIG. 8 shows a section view of mounting head 50 installed on rod 18. The scope is attached to the mounting head after the mounting head is assembled. Ball 26 is preferably pivoted up as shown, so that the stem sticks out the upper part of access notch 64. The head of mounting screw 40 is then accessible through the lower part of access notch 64. The user then tightens the mounting screw to lock the scope to mounting plate 32. The spotting scope then moves in unison with ball 26.

When adjusting knob 20 is tightened (threaded further into the body), bar clamp 58 is pressed against rod 18 (with the cylindrical rod receiver 70 on the bar clamp pressing against the cylindrical surface of the rod). This forces body 22 to the right in the view as shown. Contraction 62 presses ball 26 into ball clamp 56, which clamps the ball clamp against the rod on the side opposite the bar clamp. As the adjusting screw is snugged, ball 26 is locked tightly in place by being squeezed between contraction 62 and ball clamp 56. The rod is squeezed tightly between the ball clamp and bar clamp. Thus, mounting head 50 is locked securely in place. Likewise, ball 26 is locked securely between the contraction and the ball clamp. The spotting scope is thereby locked securely to the rod and ready for use.

To adjust the position or orientation of the spotting scope, the user need only slacken the adjusting knob. The scope can then be adjusted as desired. When the scope is close to the desired position, the user can tighten the adjusting knob to the point where the scope can still be moved slightly. The user can then make the final adjustments before completely tightening the adjusting knob and locking the scope in place.

When the device is transported, the mounting head will often be detached from the rod. The sets of flats 72 on the ball clamp and bar clamp allow the two clamps to be pressed together by the adjusting knob when no rod is present. Thus, the components within the body can be secured by compressing them with the adjusting knob when not in use. Of course, the cylindrical surfaces of the rod receivers 70 dictate that both the ball clamp and rod clamp should remain in the correct orientation. A pair of pins riding within slots can accomplish this objective. Likewise, a male or female keyway can be used.

Returning to FIG. 7, the reader will observe that both ball clamp 56 and bar clamp 58 feature a notch 80. Returning to FIG. 5, the reader will note the presence of two pin holes 66 in body 22. A small pin can be place in both of the two pin holes 66. These pins will then ride within the notches in the ball clamp and bar clamp. Thus, the two clamps are allowed to slide back and forth, but not rotate within the body.

Those skilled in the art will realize that the same basic functions can be carried out while omitting certain parts. Bar clamp 58 and belleville washer 60 can be removed. The threaded portion of the adjusting knob would then bear directly against the rod. While somewhat less secure, this version would work.

Likewise, the bar clamp can be used without belleville washer 60. However, belleville washer 60 (generally a dished flat washer made of spring steel so that it can be compressed) helps take up slack in the assembly and assists in the exertion of a steady clamping force. Thus, the embodiment using the bar clamp and the washer is the preferred embodiment.

Figure 9:
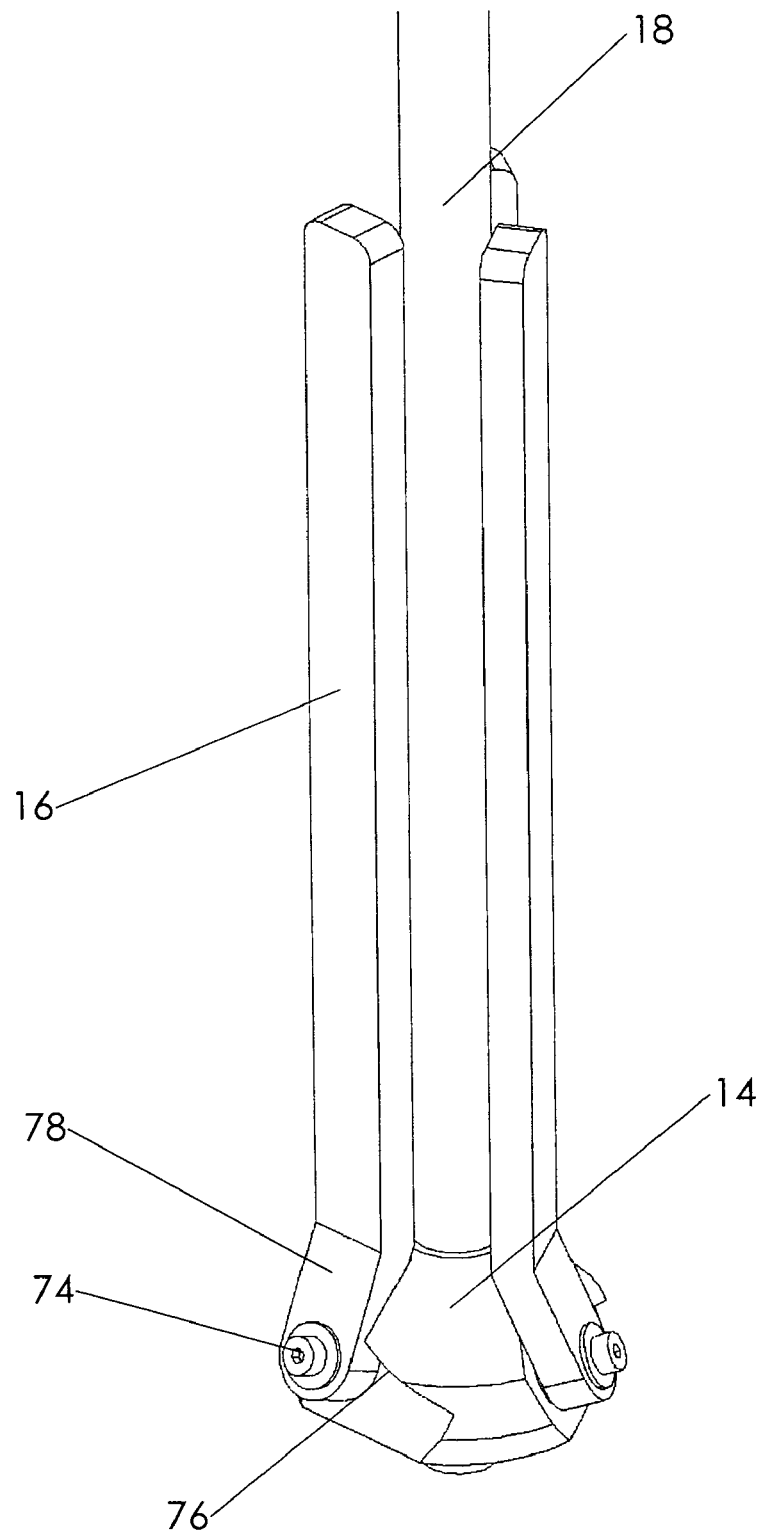
FIG. 9 is a perspective view, showing the legs folded against the base.
Figure 10:
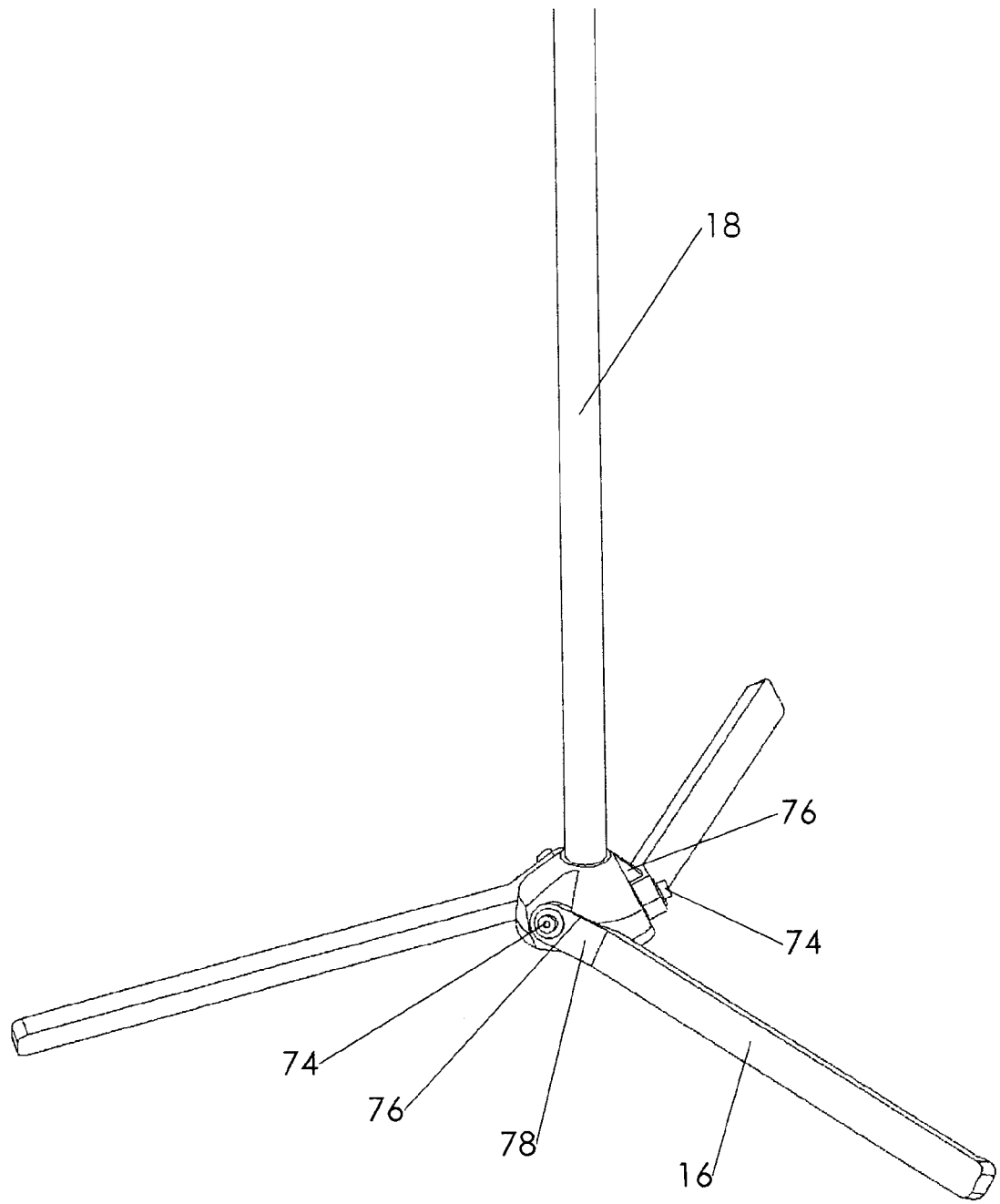
FIG. 10 is a perspective view, showing the legs in a deployed state.

Portability is an advantage in a device such as shown in FIG. 1. Thus, it is desirable to have the legs 16 fold into a less bulky configuration. FIGS. 9 and 10 show how this can be done. Each leg 16 is attached by a pivot 74 to base 14. Each leg includes a short canted portion 78 which actually includes the pivot joint. This canted portion 78 rests within a notch cut into base 14.

FIG. 9 shows all three legs in the folded position, suitable for transportation. The user deploys the legs by rotating them. As an example, the user would deploy the left leg in the view as shown by rotating it in a counterclockwise direction. The leg would rotate until canted portion 78 comes up against stop 76. The other two legs are likewise rotated until they come up against their respective stops 76. The device is then placed on a flat surface as shown in FIG. 10.

The weight of the assembly tends to force the canted portion of each leg against its respective stop. Thus, the deployed state shown is quite stable. In order to re-fold the legs, the user must lift the device clear of the surface.

The preceding description contains significant detail regarding the novel aspects of the present invention. It is should not be construed, however, as limiting the scope of the invention but rather as providing illustrations of the preferred embodiments of the invention. As an example, although a spotting scope has been used as an example of an object to be mounted using the present invention, many different objects could be mounted. Examples include video cameras, microphones, and proximity sensors. Thus, the scope of the invention should be fixed by the following claims, rather than by the examples given.

Having described my invention, I claim:

1. A mounting head allowing a user to adjustably mount an object to a stand, comprising:
    a. a cylindrical body, including
        i. a hollow interior;
        ii. a first end;
        iii. a second end;
        iv. a long axis;
        v. a rod opening passing completely through said cylindrical body in a direction which is approximately transverse to said long axis;
        vi. a threaded receiver proximate said first end;
        vii. a contraction proximate said second end;
        viii. an opening proximate said second end;
    b. a ball, located within said hollow interior of said cylinder, proximate said contraction, wherein said ball has a stem extending out said opening;
    c. a ball clamp, located within said hollow interior of said cylinder, proximate said contraction;
    d. object mounting means attached to said stem for mounting said object to said stem; a rod, said rod insertedly situated within said rod opening of said cylindrical body, wherein said cylindrical body is free to slide up and down said rod and yaw around said rod, thereby allowing said user to adjust the position of said cylindrical body on said rod; and
    f. an adjustment knob, having a threaded portion sized to engage said threaded receiver in said cylindrical body, so that if said user places said rod through said rod opening and between said ball clamp and said threaded portion, and then threads said threaded portion of said adjustment knob into said threaded receiver, said contraction will he drawn against said ball, thereby locking said ball in place, and said rod will be clamped between said ball clamp and said threaded portion, thereby clamping said mounting head to said rod.

2. A mounting head as recited in claim 1, further comprising a bar clamp, located within said hollow interior of said cylinder between said ball clamp and said threaded portion of said adjustment knob, so that if said user places said rod through said rod opening and between said ball clamp and said bar clamp, and then threads said threaded portion of said adjustment knob into said threaded receiver, said contraction will be drawn against said ball, thereby locking said ball in place, and said rod will be clamped between said ball clamp and said bar clamp, thereby clamping said mounting head to said rod.

3. A mounting head as recited in claim 2, further comprising a washer located between said bar clamp and said threaded portion of said adjustment knob.

4. A mounting head as recited in claim 1, wherein said object mounting means comprises:
    a. amounting plate having a first vee lock interface, a through hole, and a separate threaded hole;
    b. wherein said stem on said ball has a second vee lock interface shaped to lock into said first vee lock interface on said mounting plate;
    c. a mounting screw, passing through said ball, through said through hole on said mounting plate, and into said object; and
    d. a dog screw passing through said separate threaded hole and into said object.

5. A mounting head as recited in claim 1, wherein:
    a. said ball clamp has a first end and a second end;
    b. said first end of said ball clamp opens into a ball receiver shaped to receive said ball; and
    c. said second end of said ball clamp opens into a rod receiver shaped to receive said rod.

6. A mounting head as recited in claim 2, wherein:
    a. said ball clamp has a first end and a second end;
    b. said first end of said ball clamp opens into a ball receiver shaped to receive said ball; and
    c. said second end of said ball clamp opens into a rod receiver shaped to receive said rod.

7. A mounting head as recited in claim 6, wherein:
    a. said bar clamp has a first end and a second end; and
    b. said first end of said bar clamp opens into a rod receiver shaped to receive said rod.

8. A mounting head as recited in claim 7, wherein:
    a. said ball clamp includes a flat on said second end of said ball clamp;
    b. said bar clamp includes a flat on said first end of said bar clamp positioned to bear against said flat on said ball clamp.

9. A mounting head as recited in claim 3 wherein said washer is a belleville washer.

10. A mounting head as recited in claim 1, wherein said opening proximate said second end of said body includes an access notch.

11. A mounting head as recited in claim 2, wherein said opening proximate said second end of said body includes an access notch.

12. A mounting head as recited in claim 3, wherein said opening proximate said second end of said body includes an access notch.

13. A mounting head as recited in claim 4, wherein said body further comprises a wrench access hole passing into said hollow interior, positioned to allow access to said mounting screw from outside said body when said ball is within said body.

14. A mounting head as recited in claim 2, wherein said object mounting means comprises:
 a. a mounting plate having a first vee lock interface, a through hole, and a separate threaded hole;
 b. wherein said stem on said ball has a second vee lock interface shaped to lock into said first vee lock interface on said mounting plate;
 c. a mounting screw, passing through said ball, through said through hole on said mounting plate, and into said object; and
 d. a dog screw passing through said separate threaded hole and into said object.

15. A mounting head as recited in claim 3, wherein said object mounting means comprises:
 a. a mounting plate having a first vee lock interface, a through hole, and a separate threaded hole;
 b. wherein said stem on said ball has a second vee lock interface shaped to lock into said first vee lock interface on said mounting plate;
 c. a mounting screw, passing through said ball, through said through hole on said mounting plate, and into said object; and
 d. a dog screw passing through said separate threaded hole and into said object.

16. A mounting head as recited in claim 5, wherein said object mounting means comprises:
 a. a mounting plate having a first vee lock interface, a through holes and a separate threaded hole;
 b. wherein said stem on said ball has a second vee lock interface shaped to lock into said first vee lock interface on said mounting plate;
 c. a mounting screw, passing through said ball, through said through hole on said mounting plate, and into said object; and
 d. a dog screw passing through said separate threaded hole and into said object.

17. A mounting head as recited in claim 6, wherein said object mounting means comprises:
 a. a mounting plate having a first vee lock interface, a through hole, and a separate threaded hole;
 b. wherein said stem on said ball has a second vee lock interface shaped to lock into said first vee lock interface on said mounting plate;
 c. amounting screw, passing through said ball, through said through hole on said mounting plate, and into said object; and
 d. a dog screw passing through said separate threaded hole and into said object.

18. A mounting head as recited in claim 7, wherein said object mounting means comprises:
 a. a mounting plate having a first vee lock interface, a through hole, and a separate threaded hole;
 b. wherein said stem on said ball has a second vee lock interface shaped to lock into said first vee lock interface on said mounting plate;
 c. a mounting screw, passing through said ball, through said through hole on said mounting plate, and into said object; and
 d. a dog screw passing through said separate threaded hole and into said object.

19. A mounting head as recited in claim 8, wherein said object mounting means comprises:
 a. a mounting plate having a first vee lock interface, a through hole, and a separate threaded hole;
 b. wherein said stem on said ball has a second vee lock interface shaped to lock into said first vee lock interface on said mounting plate;
 c. a mounting screw, passing through said ball, through said through hole on said mounting plate, and into said object; and
 d. a dog screw passing through said separate threaded hole and into said object.

20. A mounting head as recited in claim 9, wherein said object mounting means comprises:
 a. a mounting plate having a first vee lock interface, a through hole, and a separate threaded hole;
 b. wherein said stem on said ball has a second vee lock interface shaped to lock into said first vee lock interface on said mounting plate;
 c. a mounting screw, passing through said ball, through said through hole on said mounting plate, and into said object; and
 d. a dog screw passing through said separate threaded hole and into said object.

* * * * *